United States Patent
Maeda et al.

(10) Patent No.: US 12,229,693 B2
(45) Date of Patent: Feb. 18, 2025

(54) SYSTEMS AND METHODS FOR DYNAMIC CHARGER RESERVATIONS

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US)

(73) Assignee: Honda Motor Co., Ltd., Tokyo (JP)

(*) Notice: Subject to any disclaimer, the term of this patent is extended or adjusted under 35 U.S.C. 154(b) by 517 days.

(21) Appl. No.: 17/396,606

(22) Filed: Aug. 6, 2021

(65) Prior Publication Data
US 2023/0045214 A1    Feb. 9, 2023

(51) Int. Cl.
| | |
|---|---|
| *H02J 7/00* | (2006.01) |
| *B60L 53/62* | (2019.01) |
| *B60L 53/63* | (2019.01) |
| *B60L 53/64* | (2019.01) |
| *B60L 53/66* | (2019.01) |
| *G06Q 10/02* | (2012.01) |
| *G06Q 50/40* | (2024.01) |
| *H04W 4/44* | (2018.01) |

(52) U.S. Cl.
CPC ............ *G06Q 10/02* (2013.01); *B60L 53/62* (2019.02); *B60L 53/63* (2019.02); *B60L 53/64* (2019.02); *B60L 53/665* (2019.02); *G06Q 50/40* (2024.01); *H04W 4/44* (2018.02)

(58) Field of Classification Search
USPC ........................................................ 320/109
See application file for complete search history.

(56) References Cited

U.S. PATENT DOCUMENTS

| | | |
|---|---|---|
| 9,024,580 B2 | 5/2015 | Wu et al. |
| 9,317,086 B2 | 4/2016 | Sellschopp |
| (Continued) | | |

FOREIGN PATENT DOCUMENTS

| | | |
|---|---|---|
| CN | 107025730 | 8/2017 |
| CN | 107199905 | 9/2017 |
| (Continued) | | |

OTHER PUBLICATIONS

Office Action U.S. Appl. No. 17/396,610 dated Mar. 14, 2024, 20 pages.
(Continued)

*Primary Examiner* — Samuel Berhanu
(74) *Attorney, Agent, or Firm* — Rankin, Hill & Clark LLP

(57) ABSTRACT

Systems and methods for dynamic charger reservations are provided. In one embodiment, a method includes identifying an initial reservation for an electric vehicle to receive a charge from a charging entity at a first place at a first time. The method also includes calculating an estimated time of arrival and an arrival state of charge of at a reservation time. The method further includes detecting a grid event that changes the first cost for the charging entity. The method yet further includes generating a revised reservation for the electric vehicle. The method includes generating an initial compensation offer based on the estimated time of arrival and the arrival state of charge. The method also includes providing the revised reservation and the initial compensation offer to a user. The method further includes updating the initial reservation to the revised reservation in response to receiving a confirmation from the user.

19 Claims, 6 Drawing Sheets

(56) References Cited

U.S. PATENT DOCUMENTS

| | | |
|---|---|---|
| 9,796,286 B2 | 10/2017 | Atluri et al. |
| 10,126,796 B2 | 11/2018 | Dorn et al. |
| 10,872,361 B2 | 12/2020 | Khoo et al. |
| 10,953,765 B1 | 3/2021 | Sun et al. |
| 2010/0156349 A1 | 6/2010 | Littrell |
| 2011/0202217 A1* | 8/2011 | Kempton ............... G06Q 20/22 320/109 |
| 2012/0268061 A1* | 10/2012 | Bhageria ............... B60L 53/65 320/107 |
| 2013/0211988 A1* | 8/2013 | Dorn ............... B60L 53/65 700/297 |
| 2013/0339108 A1* | 12/2013 | Ryder ............... G06Q 10/02 705/14.1 |
| 2014/0184170 A1* | 7/2014 | Jeong ............... G06Q 50/06 320/137 |
| 2015/0137753 A1 | 5/2015 | Cha et al. |
| 2015/0298565 A1* | 10/2015 | Iwamura ............... G06Q 10/04 701/22 |
| 2015/0367740 A1* | 12/2015 | McGrath ............... B60L 53/64 320/137 |
| 2018/0189900 A1 | 7/2018 | Díaz et al. |
| 2019/0160958 A1 | 5/2019 | Chaudhary et al. |
| 2019/0308510 A1 | 10/2019 | Beaurepaire et al. |
| 2019/0351783 A1 | 11/2019 | Goei |
| 2020/0156494 A1 | 5/2020 | Niikawa et al. |
| 2021/0039508 A1 | 2/2021 | Pan et al. |
| 2021/0065073 A1 | 3/2021 | Maeda et al. |
| 2021/0088992 A1 | 3/2021 | Lee et al. |
| 2021/0221243 A1 | 7/2021 | Kawamoto et al. |

FOREIGN PATENT DOCUMENTS

| | | |
|---|---|---|
| CN | 107248225 | 10/2017 |
| CN | 107346452 | 11/2017 |
| CN | 108198342 | 6/2018 |
| CN | 108749611 | 11/2018 |
| FR | 2977088 B1 | 3/2018 |
| JP | 2010230615 | 10/2010 |
| WO | WO2020120095 | 6/2020 |

OTHER PUBLICATIONS

Notice of Allowance U.S. Appl. No. 17/396,610 dated Sep. 3, 2024, 13 pages.

* cited by examiner

SYSTEMS AND METHODS FOR DYNAMIC CHARGER RESERVATIONS

RELATED APPLICATIONS

The present application is related to co-pending application entitled SYSTEMS AND METHODS FOR FLEXIBLE CHARGER RESERVATIONS, filed on the same date as the present application. The co-pending application is incorporated herein by reference, but is not admitted to be prior art with respect to the present application.

BACKGROUND

Electric vehicles contain electric storage mechanisms (e.g., electric engines powered by rechargeable batteries) to store electricity and power the electric vehicles. The electric storage mechanisms may be replenished periodically by using, for example, charging equipment installed at public or private charging stations. To manage users' access, users may make reservations for their electric vehicle to charge at a specific time. However, circumstances may make charging the electric vehicle at the reserved time unfeasible. Accordingly, it may be desirable to change the reserved time.

BRIEF DESCRIPTION

According to one aspect, a computer-implemented method for providing dynamic charger reservations is provided. In one embodiment, the computer-implemented method includes identifying an initial reservation for an electric vehicle to receive a charge from a charging entity at a first place at a first time. The initial reservation is associated with a first cost for the charging entity. The computer-implemented method also includes calculating an estimated time of arrival for the electric vehicle to arrive at the first place at the first time and an arrival state of charge of a battery of the electric vehicle at a reservation time. The arrival state of charge is based on the estimated time of arrival and a current state of charge of the battery of the electric vehicle. The computer-implemented method further includes detecting a grid event that changes the first cost for the charging entity. The computer-implemented method yet further includes generating a revised reservation for the electric vehicle. The revised reservation is associated with a second cost for the charging entity that is less than the first cost. The computer-implemented method includes generating an initial compensation offer based on the estimated time of arrival and the arrival state of charge. The computer-implemented method also includes providing the revised reservation and the initial compensation offer to a user. The computer-implemented method further includes updating the initial reservation to the revised reservation in response to receiving a confirmation from the user.

According to another aspect, a system for dynamic charger reservations that includes a memory storing instructions when executed by a processor cause the processor to identify an initial reservation for an electric vehicle to receive a charge from a charging entity at a first place at a first time. The initial reservation is associated with a first cost for the charging entity. The instructions also cause the processor to calculate an estimated time of arrival for the electric vehicle to arrive at the first place at the first time and an arrival state of charge of a battery of the electric vehicle at a reservation time. The arrival state of charge is based on the estimated time of arrival and a current state of charge of the battery of the electric vehicle. The instructions further cause the processor to detect a grid event that changes the first cost for the charging entity. The instructions yet further cause the processor to generate a revised reservation for the electric vehicle. The revised reservation is associated with a second cost for the charging entity that is less than the first cost. The instructions also cause the processor to generate an initial compensation offer based on the estimated time of arrival and the arrival state of charge. The instructions also cause the processor to provide the revised reservation and the initial compensation offer to a user. The instructions also cause the processor to update the initial reservation to the revised reservation in response to receiving a confirmation from the user.

According to still another aspect, a non-transitory computer readable storage medium storing instructions that when executed by a computer, which includes a processor perform a method is provided. The method includes identifying an initial reservation for an electric vehicle to receive a charge from a charging entity at a first place at a first time. The initial reservation is associated with a first cost for the charging entity. The method also includes calculating an estimated time of arrival for the electric vehicle to arrive at the first place at the first time and an arrival state of charge of a battery of the electric vehicle at a reservation time. The arrival state of charge is based on the estimated time of arrival and a current state of charge of the battery of the electric vehicle. The method further includes detecting a grid event that changes the first cost for the charging entity. The method yet further includes generating a revised reservation for the electric vehicle. The revised reservation is associated with a second cost for the charging entity that is less than the first cost. The method includes generating an initial compensation offer based on the estimated time of arrival and the arrival state of charge. The method also includes providing the revised reservation and the initial compensation offer to a user. The method further includes updating the initial reservation to the revised reservation in response to receiving a confirmation from the user.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
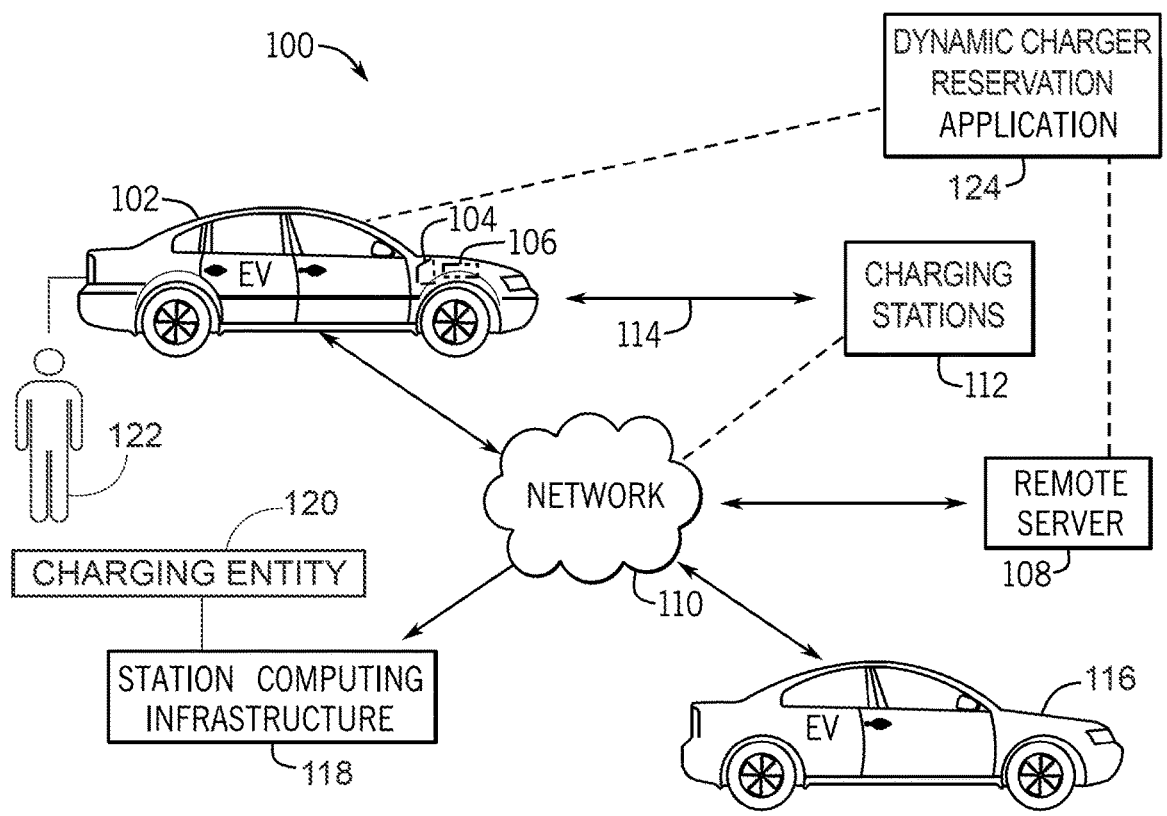
FIG. 1 is a high-level schematic view of an illustrative system for dynamic charger reservations according to an exemplary embodiment.

The systems and methods herein are directed to providing dynamic charger reservations that can be altered. For example, suppose that the user has made an initial reservation to charge an electric vehicle, and that the initial reservation has been accepted by the charging entity that manages the charging station. But due to a grid event, the charging entity may wish to reduce load on the electrical grid and/or save money by not providing a charge to the electrical vehicle during this reserved time. Through the various interfaces (e.g., portable device, infotainment system, vehicle, etc.), a revised reservation may be offered to the user with a compensation offer to entice the user to accept the revised reservation.

The compensation offer may be given to the user based on the distance and/or time to the charging station. For example, the charging entity is able to defer user's reservation to earlier in the day, a lower value compensation offer may be provided. As distance and/or time to the initial reservation nears, the compensation offer may be increased. In either case, the charging entity may find an alternative place and/or an alternative time for the user to charge the electric vehicle that allows the charging entity change the initial reservation to the revised reservation. Furthermore, charging entity may proliferate the change through the user's scheduling services. For example, the charging entity may automatically update the user's calendar.

The systems and methods may also calculate how much power is reduced by telling the user to not charge. In one embodiment, the charging entity may try to manage demand on the grid by managing charger reservations thereby making the charger reservations dynamic. This can reduce stress on the infrastructure caused by high demand. In another embodiment, the charging entity can better manage the cost of charging vehicles. For example, the charging entity can prioritize higher profit reservations. Giving charging entities the ability to make charger reservations dynamic, such that reservations can be altered, may improve the functioning of the electrical grid and infrastructure and improve the business model of the charging entity.

Definitions

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

A "user" is an entity associated at least one rechargeable electric vehicle. For example, the user may be one or more human occupants carried by the electric vehicle. In another embodiment, the user may be an entity tasked with maintaining one or more electric vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview:

Referring now to the drawings, wherein the showings are for purposes of illustrating one or more exemplary embodiments and not for purposes of limiting same, FIG. 1 is a high-level schematic view of an illustrative system 100 for dynamic charger reservations according to an exemplary embodiment. The components of the system 100, as well as the components of other systems and architectures discussed herein, may be combined, omitted or organized into different architectures for various embodiments.

In the exemplary embodiment of FIG. 1, the system 100 includes an electric vehicle (EV) 102 powered by an electric motor 104 and an electric storage mechanism, for example, a battery 106. In one embodiment, the EV 102 is purely electric in that it only has the electric motor 104. In other embodiments, the EV 102 may have the electric motor 104 and an internal combustion engine (not shown). In some embodiments, the EV 102 may have any number of electric motors, batteries, and/or internal combustion engines and they may operate in series (e.g., as in an extended range electric vehicle), in parallel, or some combination of series and parallel operation.

The EV 102 may be operably connected for computer communication to a remote server 108 via a wireless communication network 110. The EV 102 may transmit and receive data (e.g., state of charge data, energy cost data, charging commands/signals) to and from the remote server 108, and vice versa, through the network 110. The remote server 108 may be a remote computing system or a device remote (e.g., off-board) from the EV 102. In some embodiment, the remote server 108 may provide scheduling services for the user 122. The system architectures of the EV 102 and the remote server 108 will be discussed in more detail herein with regard to FIG. 2, FIG. 3, and FIG. 4.

In the exemplary embodiment of FIG. 1, the system 100 may include one or more charging stations 112 that may connect to the EV 102 via a (respective) charging link 114. The charging stations 112 may include charging equipment (not shown) that may replenish the battery 106 of the EV 102 with charging power. The charging stations may be grouped in one geographic location or spread out over a plurality of geographic locations, as will be discussed with regard to FIG. 5.

Additionally, in some embodiments, the charging stations 112 may be operably connected for computer communication with the EV 102 and/or the remote server 108, for example, to transmit and receive data (e.g., charge parameters, charging data and feedback, vehicle system data) to and from the EV 102 and/or the remote server 108. The charging link 114 may be a wired or wireless link to the charging stations 112. Computer communication may occur also via the charging link 114 and/or a wired or wireless communication link. In one embodiment, the EV 102, the charging stations 112 and/or the charging link 114 may be operably controlled to initiate or terminate charging of the EV 102 from the charging stations 112 based on one or more charging schedules that are implemented within the system 100.

In one or more embodiments, the charging stations 112 may include charging equipment that may be installed at a residential home or outside a residential home, for example, at a public (e.g., non-networked) or private (e.g., networked) charging stations. The charging stations 112 may include a charging station identification designation (e.g., identification number, serial number, alpha-numeric code, station name) that may be used to identify particular charging stations 112. The charging stations 112 may replenish the battery 106 using a charging energy source type that indicates the type of energy the charging stations 112 provides. Energy may include clean renewable energy and non-renewable energy. Clean renewable energy may include, solar energy, hydro energy, biomass energy, wind energy, among others. Non-renewable energy may include electricity from a grid source, and in the case of hybrid vehicles, fossil fuels. Energy may be provided from one or more energy providers (not shown) such as utility providers, power plants, etc.

In one or more embodiments, the EV 102 may be configured to output charging power to one or more additional electric vehicles 116 that may be physically linked via a vehicle to vehicle charging link (e.g., physical wired link, wireless link) (not shown) with the EV 102. The EV 102 may also be configured to receive charging power to charge the battery 106 of the EV 102 from one or more additional electric vehicles 116 that may be linked via the vehicle to vehicle charging link with the EV 102. Accordingly, the EV 102 and/or the one or more additional electric vehicles 116 may be configured to complete vehicle to vehicle wireless and/or wireline charging that may be completed in real-time without utilization of the charging stations 112.

In one or more configurations, the EV 102 may be configured of being capable of being fast charged based on fast charging components (not shown) that may be operably connected to the battery 106 and/or that may be included as part of the battery 106. Fast charging may enable the EV 102 to be charged at a faster charging speed (e.g., than a default charging speed) when being charged by a fast charging electric charging equipment (not shown) that may be included at the charging stations 112. In particular, fast charging may provide a higher charging voltage from a default/conventional charging voltage (e.g., increase from 240 volts to 480 volts) to more quickly charge the battery 106 of the EV 102. Accordingly, during utilization of fast charging the battery 106 of the EV 102 may be more quickly charged to a particular state of charge level than during the utilization of a conventional electric vehicle charging speed. The charging stations 112 may thereby provide a particular charging rate structure that may pertain to the utilization of the conventional electric vehicle charging speed. Additionally, the charging stations 112 may provide a particular charging rate structure that may pertain to the utilization of the fast electric vehicle charging speed.

In an exemplary embodiment, the EV 102, the charging stations 112, the additional electric vehicles 116, and/or the remote server 108 may receive and transmit data through the network 110 to a charging station computing infrastructure 118 (station computing infrastructure). The station computing infrastructure 118 may include one or more computing devices (not shown) that may communicate with one or more charging entities 120 (e.g., charging station corporate owner) that may include utility providers, fuel providers, and/or entities that own and/or operate one or more various types of charging stations, fuel stations, energy stations, and the like.

In one embodiment, the station computing infrastructure 118 may receive perspective and/or real-time price data that may be provided by each respective charging stations 112 to communicate different charging rates. The perspective and/or real-time price data may include charging rates during a certain period of time (e.g., hourly, daily, weekly), charging rates to charge the EV 102 at various charging speeds (e.g., conventional electric vehicle charging speed, fast electric vehicle charging speed, charging power levels), charging rates that may be based on a customer rating that may be applied to a user 122 associated with the EV 102, and/or charging rates that may be applied to the user 122 of the EV 102 based on one or more compensation offers (e.g., incentives, discounts, credits, etc.) that may be provided to the user 122.

In some embodiments, the station computing infrastructure 118 may determine a price per kilowatt-hour of energy (price per kWh) that may be communicated to the EV 102, the remote server 108, and/or the charging stations 112 based on utility rates that are received from the one or more energy providers. The price per kWh may include a dynamic value that may change over time based on a time of day, a season, a region, a time zone, etc. For example, each hour of a particular day may include a different price per kWh based on one or more pricing schemes that are implemented by the one or more energy providers. The price per kWh may be incurred by the charging entity 120. As one example, the energy provider may invoice the charging entity 120 for the total amount of energy consumed by the charging stations 112. The charging entity 120 may pass the cost to the user 122 by invoicing the user 122 for the cost to charge the EV 102.

In an exemplary embodiment, the system 100 may include a dynamic charger reservation application 124 that may provide various types of enhancements that may be applicable to the charging of the EV 102 and additional electric vehicles 116. In an exemplary embodiment, the dynamic charger reservation application 124 may be executed by the EV 102 (e.g., a processor, an electronic control unit), the remote server 108 (e.g., a processor), and/or the station computing infrastructure 118 (e.g., a processor). The dynamic charger reservation application 124 may include various modules and/or logic (not shown) to alter reservations made by a user 122 of the EV 102 and provide compensation offers from the perspective of the user 122 of the EV 102. In particular, the dynamic charger reservation application 124 may be configured to alter an existing reservation to a different time and/or different location, iteratively calculate a compensation offer for the user 122 dynamically based determined geo-location(s) that may be based on one or more factors associated with the EV 102, and/or provide the user 122 an interface to confirm the alteration to the existing reservation and/or accept the compensation offer.

Figure 2:
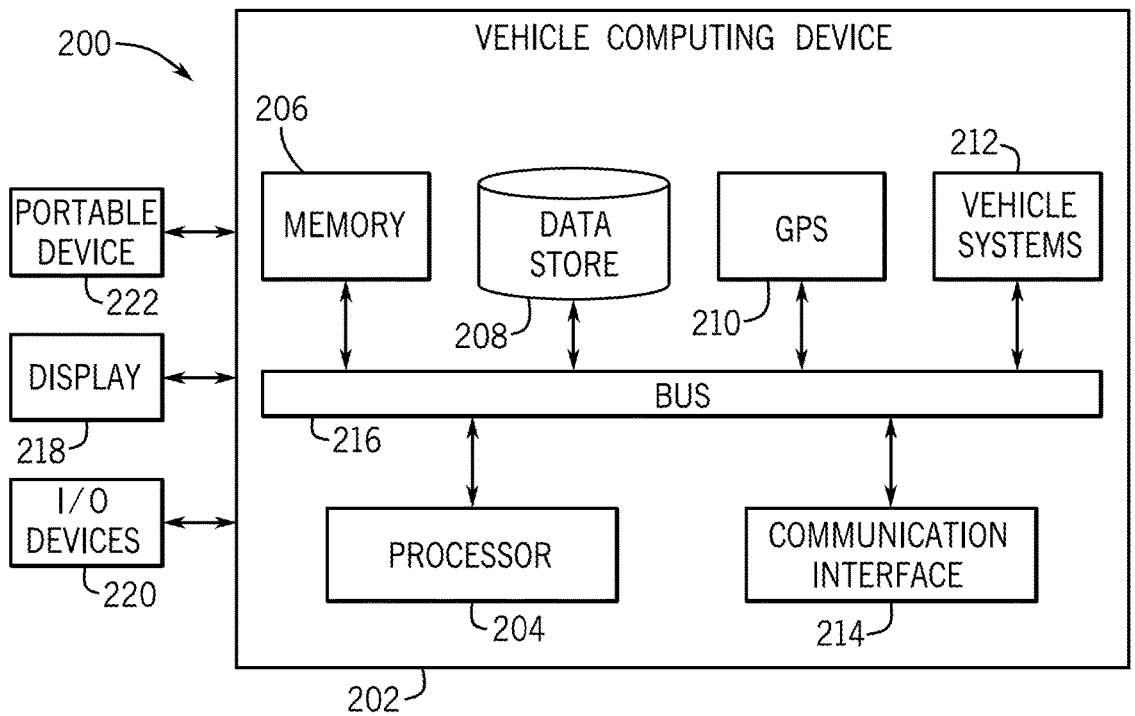
FIG. 2 is a schematic view of an illustrative electric vehicle architecture according to an exemplary embodiment.

Referring now to FIG. 2, a schematic view of an illustrative electric vehicle architecture 200, for example the EV 102 of FIG. 1, is shown according to an exemplary embodiment. In particular, the EV 102 may include a vehicle computing device 202 (e.g., a telematics unit, an electronic control unit) with provisions for processing, communicating and interacting with various components of the EV 102 and other components of the system 100. The vehicle computing device 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV 102 may include other components and systems not shown.

The communication interface 214 of the EV 102 may provide software, firmware and/or hardware to facilitate data input and output between the components of the vehicle computing device 202 and other components, networks and data sources. Further, the communication interface 214 may facilitate communication with a display 218 (e.g., head unit display, head up display, dash board display) in the EV 102 and other input/output devices 220, for example, a portable device 222 (e.g., key fob, smart phone) connected to the EV 102.

In some embodiments the portable device 222 may include some or all of the components and functionality of the vehicle computing device 202. Additionally, the communication interface 214 may facilitate communication between the EV 102 and the portable device 222 that may include a display and/or input/output devices (not shown) be used to operate various functions of the EV 102. In one embodiment, the display 218 of the EV 102 and/or the portable device 222 (e.g., through a display screen of the portable device 222) may be utilized to provide one or more user interfaces that may be included as a human machine interface(s) of the dynamic charger reservation application 124.

Figure 3:
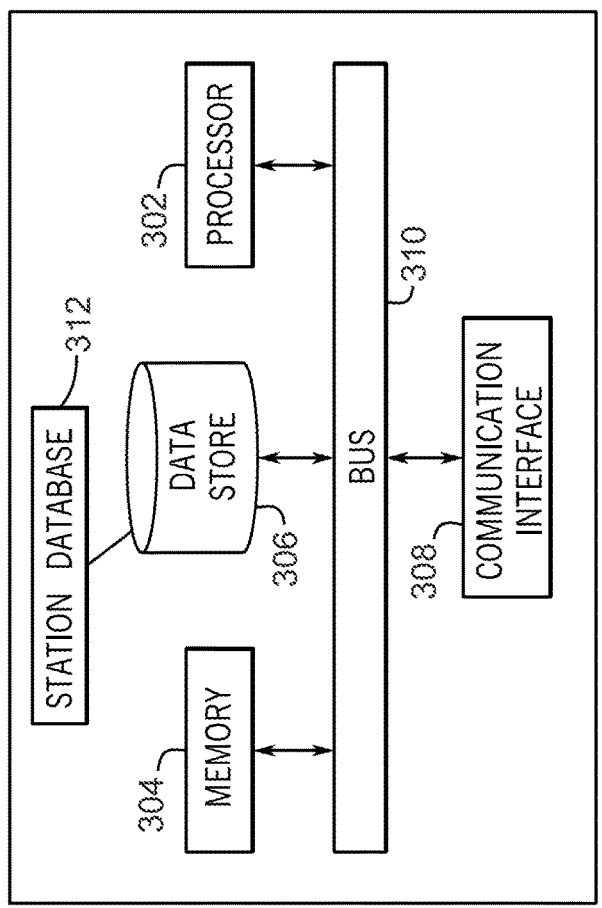
FIG. 3 is a schematic view of an illustrative remote server architecture according to an exemplary embodiment.

Referring now to FIG. 3, a schematic view of an illustrative station computing infrastructure architecture 118, for the station computing infrastructure 118 or alternatively the remote server 108 of FIG. 1, is shown according to an exemplary embodiment. The station computing infrastructure 118, is located remotely (i.e., off-board) from the EV 102 (as shown in FIG. 1). In some embodiments, the station computing infrastructure 118 may be maintained by the charging entity 120, such as an Original Equipment Manufacturer (OEM) (e.g., of the EV 102), a utility provider, a regulatory body, among others. In additional embodiments, the station computing infrastructure 118 may be another type of remote device or supported by a cloud architecture. In FIG. 3, the station computing infrastructure 118 has a station computing infrastructure architecture 118 that may include a processor 302, a memory 304, a data store 306 and a communication interface 308. The components of the station computing infrastructure architecture 118 may be operably connected for computer communication via a bus 310 and/or other wired and wireless technologies. The station computing infrastructure 118 as well as the remote server 108 may include other components and systems not shown.

The data store 306 may store application data that may also include data pertaining to the dynamic charger reservation application 124. In one configuration, the data store 306 may include a user dataset (not shown) that may include data pertaining to users of electric vehicles (including the user 122 of the EV 102) that may utilize the charging stations 112. In one configuration, the user dataset may include a charging schedule that may be associated with the EV 102 utilized by the user 122. As discussed below, the dynamic charger reservation application 124 may allow the user 122 and/or the charging entity 120 to update the charging schedule associated with the EV 102 and/or additional electric vehicles 116 that may utilize one or more charging stations 112. Updating the charging schedule may include revising and cancelling reservations made by a user 122 for the EV 102. The user dataset may also include a history of compensation offers and whether the user 122 accepted or declined the compensations offers determined by the dynamic charger reservation application 124 and/or one or more charging entities 120 that may be provided based on one or more factors.

In one configuration, the data store 306 may include a station database 312 that may include respective records of charging stations 112 that may be owned and/or operated by the charging entity 120. The station database 312 may include records that each pertain to particular charging stations 112 that include data that may be pre-updated and/or updated in real-time by the charging entity 120. In one configuration, the station database 312 may include records that may pertain to particular charging stations 112 and their respective geo-locations (GPS/DGPS coordinates of the charging stations 112).

The station database 312 may also include records that may pertain to one or more particular charging stations 112 and one or more pricing schemes that may be implemented by the respective charging stations 112. The one or more pricing schemes may include a price per kWh that may include a dynamic value that may change over time based on a time of day, a season, a region, a time zone, charging power requirements, a charging speed, charging queue place, customer incentives, etc. For example, each hour of a particular day may include a different price per kWh based on one or more pricing schemes that are implemented by the one or more energy providers. Additionally, the one or more pricing schemes may include price per kWh that may be influenced based on a respective user 122 and/or additional factors including, but not limited to, purchase of goods and/or services from the charging entity 120 and/or additional retailers/service providers. In some embodiments, the station database 312 may also include records that pertain to particular charging stations 112 and current utilization of the charging stations 112. The current utilization of the charging stations 112 may pertain to wait times that may be applicable with respect to the charging of the EV 102.

In one configuration, the communication interface 308 may provide software, firmware and/or hardware to facilitate data input and output between the components of the computing device 302 and other components, networks and data sources. In some embodiments, the communication interface 308 may be used to communicate with the EV 102, the charging stations 112, the portable device 222, additional electric vehicles 116, and/or other components of system 100 and the electric vehicle architecture 200.

II. Methods for Providing Dynamic Charger Reservations

The dynamic charger reservation application 124 and its components will now be discussed in more detail according to an exemplary embodiment and with continued reference to FIGS. 1-3 and 5. In one or more embodiments, the dynamic charger reservation application 124 may be executed by the station computing infrastructure architecture 118 of the station computing infrastructure 118 or alternatively the remote server 108. In an alternate embodiment, the dynamic charger reservation application 124 may be executed by a processor (not shown) of the portable device 222. For example, a system for dynamic charger reservations may be performed by the dynamic charger reservation application 124 via the memory 304 storing instructions executed by the processor 302.

In one or more configurations, data may be sent or received from the dynamic charger reservation application 124 to the components of the EV 102, the remote server 108, the charging stations 112, the charging link 114, the charging entity 120, the portable device 222, and/or the additional electric vehicles 116. For example, commands from the dynamic charger reservation application 124 may be sent to the charging stations 112 and/or the charging link 114 to initiate or terminate charging of the EV 102 during one or more periods of time based on the one or more factors and/or the one or more charging schedules.

In an exemplary embodiment, the dynamic charger reservation application 124 may include one or more user input interfaces and/or input means (e.g., buttons) that may be presented via the display 218, presented via the portable device 222, and or included within the EV 102 and/or on the portable device 222. In one embodiment, the one or more user input interfaces and/or input means may include user interface inputs that may be utilized by an individual (e.g., the user 122 of the EV 102) to enable or disable the presentation of one or more user interface graphics that may be presented by the dynamic charger reservation application 124. Additionally, the one or more user input interfaces and/or input means may include user interface inputs that may be utilized by an individual to enable or disable one or more smart charging functions provided by the dynamic charger reservation application 124. For example, the user 122 may accept or confirm an alteration to a reservation via the one or more user input interfaces and/or input means.

Figure 4:
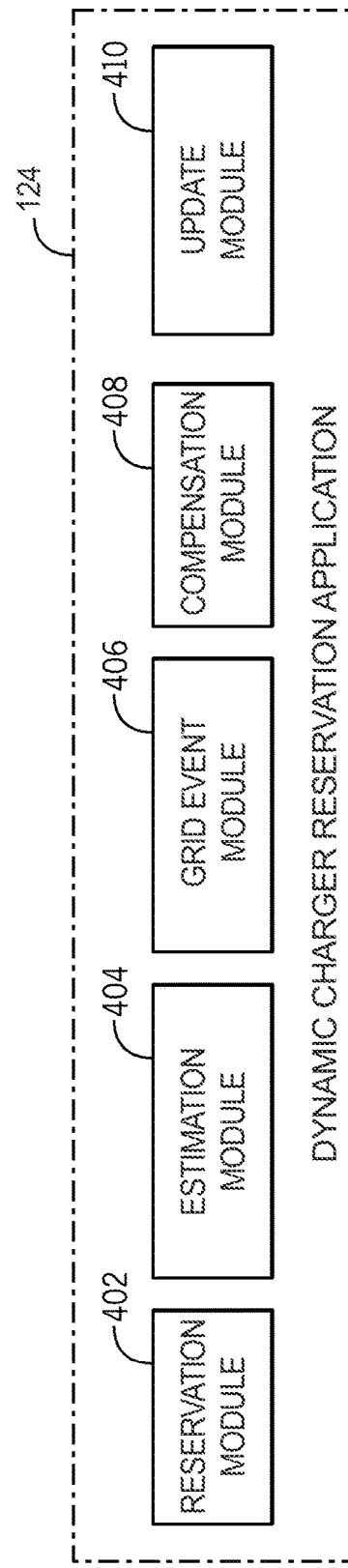
FIG. 4 is a schematic view of a plurality of modules of a dynamic charger reservation application that may execute computer-implemented instructions according to an exemplary embodiment.

FIG. 4 is a schematic view of a plurality of modules 402-410 of the dynamic charger reservation application 124 that may execute computer-implemented instructions for providing dynamic charger reservations according to an exemplary embodiment. In one embodiment, the plurality of modules 402-410 may include a reservation module 402, an estimation module 404, a grid event module 406, a compensation module 408, and an update module 410. It is appreciated that the dynamic charger reservation application 124 may include one or more additional modules and/or sub-modules that are included in addition to and/or in lieu of the modules 402-410. The plurality of modules 402-410 may be modules of a processor, such as the processor 204 or 302. The plurality of module 402-410 may receive instructions from a memory, such as the memory 206 or 304.

The reservation module 402 is configured to identify, manage, and/or modify reservations for the charging entity 120. The reservation module 402 may receive reservations from the user 122 directly. For example, the reservation module 402 may receive a reservation from the EV 102 or the portable device 222. In another embodiment, the reservation module 402 may be configured to access the station database 312 stored upon the data store 306 of the remote server 108. The station database 312 may include records that each pertain to particular charging stations 112 that include data that may be pre-updated and/or updated in real-time by charging entity 120. Such records may pertain to particular charging stations 112 and their respective geo-locations. Accordingly, the reservation module 402 may be configured to access and query the station database 312 to identify, manage, and/or modify reservations for one or more charging stations 112. The reservation module 402 may determine the availability of reservations at charging stations 112. For example, the reservation module 402 may determine if a reservation is available at a charging station 112 located within a predetermined distance (e.g., 5 miles) of the current geo-location of the EV 102 or within a predetermined distance of a type of amenity or selected point of interest location.

In one embodiment, the reservation module 402 may be configured to analyze the current geo-location of the EV 102 as determined and communicated by the estimation module 404 in addition to the current SOC and remaining distance that the EV 102 may travel as determined and communicated by the estimation module 404. The reservation module 402 may thereby be configured to determine the availability of reservation at one or more charging stations 112 that may be located within a distance that the EV 102 may travel to reach based the charging stations on the current geo-location of the EV 102, the current SOC of the battery 106 of the EV 102, and/or one or more road types (e.g., local, highway, road grades) that may be located within a vicinity of the current geo-location of the EV 102. The reservation module 402 may be configured to generate reservations, such an initial reservation and/or a revised reservation, based on the current geo-location of the EV 102 and the current SOC.

In some embodiments, the one or more travel routines may be analyzed through a neural network (not shown) to provide computer/machine based/deep learning techniques to determine whether a particular trip of the EV 102 is a routine trip or non-routine trip based on the analysis of data provided by the GPS 210. The reservation module 402 may be configured to generate a reservation based on the one or more travel routines. For example, the reservation module 402 may generate a reservation at a charging station 112 along a predicted path or routine trip.

The reservation module 402 identifies an initial reservation for the EV 102 to receive a charge from the charging entity 120 at a charging station 112. An initial reservation includes a first place at a first time for the EV 102 to receive the charge. For example, the first place may include a specific charging station 112 where the EV 102 is to be charged. The first place may be GPS/DGPS coordinates, a location associated with a charging station 112 such as a store front, restaurant, movie theater, one or more perspective pathways of the EV 102, and/or one or more points of interest.

The first time may be a time for the EV 102 to arrive at the first place to receive a charge. The first time may be the time the EV 102 is expected to start charging after a wait time. For example, at times when the charging station 112 is servicing a number of users, the user 122 may have to wait before charging. The first time may be the time at which the user 122 can expect to start charging after waiting. In another embodiment, the first time may be a duration corresponding to the length of time that the EV 102 is expected to be charging. For example, suppose the EV 102 is scheduled to begin charging at 10:02 AM. Based on the SOC, it may be determined that the EV 102 will charge for approximately 40 minutes. Accordingly, the first time may be a duration from 10:02 AM to 10:42 AM.

The estimation module 404 estimates future values based on data received from the EV 102, the charging stations 112, the additional electric vehicles 116, the remote server 108 and/or the charging station computing infrastructure 118. For example, the estimation module 404 of the dynamic charger reservation application 124 may be configured to determine the current geo-location of the EV 102 (e.g., current GPS/DGPS coordinates of the EV 102). In particular, the estimation module 404 may be configured to communicate with the GPS 210 of the EV 102 to determine the current geo-location of the EV 102 at one or more points in time. In some embodiments, the estimation module 404 may be configured to store the one or more geo-locations of the EV 102 determined at one or more points in time within the data store 208 of the vehicle computing device 202 and/or the data store 306 of the remote server 108. The estimation module 404 may also calculate an estimated time of arrival of the EV 102 based on the current geo-location of the EV 102.

The estimation module 404 may be configured to determine a current state of charge (SOC) (e.g., charging level) of the battery 106 of the EV 102. In one configuration, the estimation module 404 may be configured to communicate with the processor 204 of the vehicle computing device 202 to determine the current SOC of the battery 106 of the EV 102. In one embodiment, the processor 204 may be configured to communicate with a micro-processor (not shown) that may be included as part of electrical circuitry of the battery 106 to determine a current SOC of the battery 106. Using the current SOC, the estimation module 404 may also calculate an arrival state of charge of a battery 106 of the EV 102. Accordingly, the estimation module 404 may be configured to determine the SOC of the battery 106 of the EV 102 at one or more points in time based on communication with the processor 204 of the vehicle computing device 202 of the EV 102. Thus, the estimation module 404 may calculate the arrival state of charge is based on the estimated time of arrival and a current state of charge of the battery of the EV 102. The current SOC may initially indicate the SOC at a reservation time when the initial reservation is identified by the reservation module 402. The current SOC may also reflect the current SOC after the reservation time.

Therefore, based on data received from the EV 102, the charging stations 112, the additional electric vehicles 116, the remote server 108 and/or the charging station computing infrastructure 118, the estimation module 404 may calculate the estimated time of arrival for the EV 102 to arrive at the first place at the first time and an arrival state of charge of a battery 106 of the EV at a reservation time. The reservation time may be the time at which the reservation is identified by the reservation module 402. The reservation time may additionally be a predetermined time at which the charging entity 120 processes reservations. For example, the charging entity 120 may process reservation one day before the first time.

The estimation module 404 may be configured to analyze the current geo-location of the EV 102 and determine a remaining distance that the EV 102 is capable of traveling. The remaining distance may be determined based on analyzing the current SOC of the battery 106, an average speed of the EV 102, and/or one or more road types (e.g., local, highway, road grades) that may be located within a vicinity of the current geo-location of the EV 102.

Figure 5:
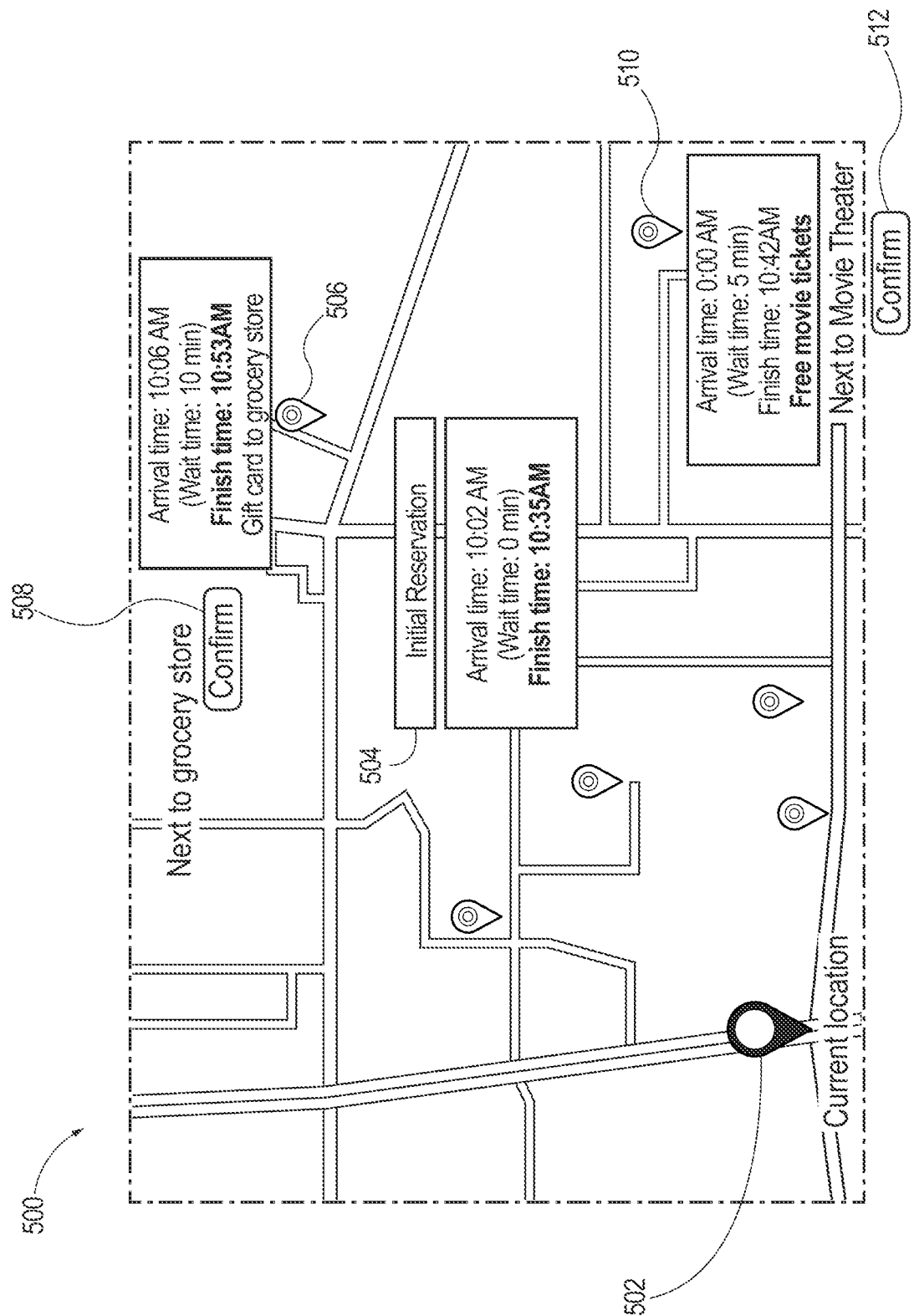
FIG. 5 is an illustrative example of a charging station map user interface according to an exemplary embodiment.

Turning to FIG. 5, an illustrative example of a charging station map user interface 500 according to an exemplary embodiment of the present disclosure, the charging station map user interface 500 may be presented with pin points that are associated with respective charging stations 112. The charging station map user interface 500 may be presented through the display 218 of the EV 102 and/or a display of the portable device 222. In some embodiments, the charging station map user interface 500 may be presented in two-dimensional format (as shown in FIG. 5). In additional configurations, the charging station map user interface 500 may be converted to a three-dimensional format, a street-view format, a first person point of view format, a satellite view format, and the like based on the receipt of a respective user interface input.

The charging station map user interface 500 may pinpoint one or more perspective geo-locations of the EV 102, and the geo-location(s) of one or more charging stations 112 that may be located within the predetermined distance of the EV 102, within a predetermined distance of one or more perspective pathways of the EV 102, near one or more points of interest at which one or more routine activities may take place, and/or at one or more locations at which the EV 102 may need to be charged to maintain a sufficient SOC to be utilized complete one or more remaining routine activities and/or non-routine activities.

In one embodiment, the charging station map user interface 500 may pin point a current geo-location 502 of the EV 102. Additionally, suppose that the user 122 has an initial reservation 504 at a first place and a first time. The charging station map user interface 500 may pinpoint the first place on the charging station map user interface 500. Additionally, the charging station map user interface 500 may include the first time when the user 122 is to arrive.

The charging station map user interface 500 may additionally illustrate alternate locations associated with available reservations. For example, the estimation module 404 may calculate a first cost for the charging entity 120 associated with the initial reservation. The first cost may be a value indicating the cost incurred by the charging entity 120 for charging the EV 102 at the first time and/or the first place. The value may be a monetary cost, a resources cost, and/or a score indicative of a cost/benefit analysis of the initial reservation 504. For example, the first cost may be calculated by the estimation module 404 based on the increased utility rates that are by the one or more energy providers. In some embodiments, the estimation module may additionally or alternatively calculate an grid event cost based on a grid event being detected by the grid event module 406.

The grid event module 406 detects changes to the electrical grid, including the one or more energy providers, the charging station 112, the station computing infrastructure 118, etc. A grid event may include power outage (i.e., a power cut, a power out, a power blackout, a power failure, a power loss, or a blackout), an intentional or unintentional drop in voltage in an electrical power supply system (i.e., brownout), increased demand, peak timeframes, demand spikes, load sharing, capacity, handling failures, and other events that affect the ability of the one or more energy providers to provide energy to the charging entity 120 and/or the user 122. Natural events (e.g., earthquakes, hurricanes, climate change, etc.), physical events (e.g., terrorist attack, infrastructure, breakdown, etc.) and cyber events (e.g., malware, viruses, etc.) that affect the grid may additionally be considered grid events.

The grid event module 406 may detect the grid event by monitoring the frequency, voltage, demand, or capacity, among others at one or more point along the grid, such as at the charging stations 112. The grid event module 406 may also be configured to receive notices of an impending or occurring grid event. The notice may be based on how much warning system operators, of the one or more energy providers, have that a grid event is coming and/or how much of the physical and cyber control systems that make up the electric grid remain operative during the grid event. For example, the one or more energy providers may schedule rolling brownouts that encompass a charging station 112.

Grid events diminish the availability of electricity and or increase the cost of electricity. Accordingly, in response to a grid event being detected by the grid event module 406, the estimation module 404 may estimate the grid event cost of charging the EV 102 according to the initial reservation 504. For example, the estimation module 404 estimate the first cost that the charging entity 120 will incur to provide the charge to the EV 102 at the first time and the first place at a reservation time when the reservation is made. At a later time, the estimation module 404 may estimate an grid event cost that the charging entity 120 will incur to provide the charge to the EV 102 in response to detecting the grid event. The grid event may cause the first cost to increase to the grid event cost for the charging entity 120.

Further in response to the grid event module 406 detecting grid event, the reservation module 402 may generate a revised reservation for the EV 102. The revised reservation is associated with a second cost for the charging entity 120 that is less than the first cost and/or the grid event cost. For example, the reservation module 402 may identify a number of available reservations commensurate with the estimated time of arrival for the EV 102 to arrive at the first place at the first time and/or the arrival SOC of a battery 106 of the EV 102. The estimation module 404 may estimate a second cost that the charging entity 120 will incur to provide the charge to the EV 102. The estimation module 404 may estimate the second cost in response to the grid event module 406 detecting a grid event and/or the reservation module 402 generating a revised reservation.

The reservation module 402 may select a revised reservation from the number of available reservations that have a second cost that is lower cost than the first cost and/or the grid event cost. For example, the reservation module 402 may select a revised reservation because it is associated with the lowest cost relative to the first cost and/or the increased first cost. As another example, the reservation module 402 may select the revised reservation because it is the closest in time or distance to the first time and the first distance of the initial reservation 504. The reservation module 402 may select the revised reservation based on preferences of the user 122, for example, for a specific type or amount of compensation offer. In this manner, if the charging entity 120 is able to find a reservation that is more cost effective than the first cost or the grid event cost, the initial reservation 504 can be revised.

The revised reservation may include second place and/or a second time for the EV 102 to receive the charge. The second place may be a different charging station at the same location, a separate location, or separate source. For example, returning to FIG. 5, the reservation module 402 may identify a first revised reservation 506 and/or a second revised reservation 510. The second cost of the revised reservation may be based on the second time and/or the second place. For example, the first second place may include a specific charging station 112 where the EV 102 is to be charged. Alternatively, the second place may allow the EV 102 to charge from a second source such as the additional vehicle 116. The second place may be GPS/DGPS coordinates, a location associated with a charging station 112 such as a store front, restaurant, movie theater, one or more perspective pathways of the EV 102, and/or one or more points of interest. The second place may be located at a variable distance from the current geo-location of the EV 102 and/or one or more perspective travel paths of the EV 102. Thus, the initial compensation offer may be based on a distance between the first place and the second place or a duration between the first time and the second time.

The compensation module 408 generates an initial compensation offer associated with the revised reservation based on the estimated time of arrival and the arrival state of charge. In one embodiment, the compensation module 408 may generate an incentive pricing scheme. In another embodiment, the compensation module 408 may be configured to communicate with the station computing infrastructure 118 to receive incentive pricing schemes that may be provided by charging entity 120 and/or one or more particular charging stations 112. In another embodiment, the compensation module 408 may communicate with remote server 108 to receive incentive pricing schemes that may be stored within the station database 312 that may include records that each pertain to particular charging stations 112 and/or the charging station entity 120.

The incentive pricing schemes may include a price per kilowatt-hour of energy (price per kWh). Because the price of energy may by dynamic, the incentive pricing schemes may include a schedule indicating how the price of energy varies in time. In some circumstances, the incentive pricing schemes may be provided by the charging entity 120 to incentivize the user 122 to charge the EV 102 according to the revised reservation, for example, at the second time and/or the second place. The revised reservation may have the EV 102 charge at an off-peak timeframe where a demand for charging may be below an average amount. For example, the user 122 may tend to charge electric vehicles during hours at night with in-home charging stations (not shown). During these peak timeframes, the charging entity 120 may be charged an increased utility rates that are by the one or more energy providers. Accordingly, the revised reservation may incentivize the user to charge the EV 102 during the day when utility rates are lower.

The charging station map user interface 500 may facilitate the user 122 selecting and/or confirming a revised reservation by indicating the relative distance between the current geo-location of the EV 102 and/or the first place of the initial reservation 504. Furthermore, the charging station map user interface 500 may indicate the first time of the initial reservation relative to the second time of the revised reservation, here the first revised reservation 506 and/or the second revised reservation 510. This information may be included on the charging station map user interface 500.

For example, the compensation module 408 may generate a compensation offer based on the amenities near the second location. Continuing the example from above, the compensation module 408 may generate a compensation offer including a gift card to the nearby grocery store should the user 122 accept the first revised reservation 506. In another embodiment, the compensation module 408 may generate a compensation offer including free movie tickets should the user 122 accept the second revised reservation 510.

In additional embodiments, the compensation module 408 may generate a compensation offer based on user preferences of the user 122. For example, the user 122 may selectively input threshold preferences related to price schemes, queue/wait times, price incentives, charging types, discounts, and amenities, among others. Accordingly, the compensation offer may be tailored to the user. It will be appreciated that while two revised reservations are described more or fewer may be generated by the reservation module 402. Accordingly, the compensation module 408 may generate more or fewer compensation offers corresponding to the one or more revised reservations. In another embodiment, the compensation module 408 may generate a single compensation offer all of the one or more revised reservations.

The update module 410 is configured to update the initial reservation 504 to the revised reservation. The update module 410 may update the initial reservation 504 to the revised reservation in response to the user confirming that it is acceptable to modify the initial reservation 504 to be the revised reservation. For example, the user 122 may confirm the change via the charging station map user interface 500. For example, suppose the user 122 is provided the revised reservations on the charging station map user interface 500 via portable device 222 or the display 218. Compensation offers may be provided by charging entity 120 to incentivize the user 122 to charge the EV 102 to accept the revised reservation. The revised reservation and the initial compensation offer are provided to the user 122. Accordingly, the charging entity 120 may offer the user 122 the charging based on the incentive pricing scheme rather than a standard pricing scheme. The incentive pricing scheme may offer the user a lower rate for the charging than the standard pricing scheme. The compensation offer may also include retail based discounts, credits, and/or offers may be presented to the user 122 through the charging station map user interface 500 to provide details with respect to one or more charging stations 112 that may provide incentives to the user 122.

The charging station map user interface 500 may be selectively enabled or disabled based on the receipt of a respective user interface input. In some configurations, the charging station map user interface 500 may be enabled in response to receiving a revised reservation. For example, the charging station map user interface may be populated with the first revised reservation 506 and/or a second revised reservation 510. The first revised reservation 506 may be associated with a first confirmation input 508 and the second revised reservation 510 may be associated with a second confirmation input 512.

If the user 122 selects the first confirmation input 508 associated with the first revised reservation 506 the initial reservation 504 may be updated to reflect details of the first revised reservation 506. For example, the initial reservation 504 may be modified to reflect the second place and/or the second time of the first revised reservation 506. Alternatively, if the user 122 selects the second confirmation input 512 associated with the second revised reservation 510, the initial reservation 504 may be updated to reflect details of the second revised reservation 510. For example, the initial reservation 504 may be modified to reflect the second place and/or the second time of the second revised reservation 510.

Updating the initial reservation 504 to a revised reservation may include altering a calendar of the user 122. Suppose that the initial reservation 504 is associated with an appointment on the user's calendar. The update module 410 may cause the appointment to be altered with the second place or the second time rather than the first place or the first time of the initial reservation 504. For example, the user 122 may maintain a digital calendar that includes an appointment for the initial reservation 504. In response to receiving a confirmation of the revised reservation, the update module 410 may include updating the appointment to the second place and/or the second time, for example, via the remote server 108. Updating the initial reservation to the revised reservation may include modifying the initial reservation 504 with the second place and/or the second time. Alternatively, updating the initial reservation to the revised reservation may include cancelling the initial reservation 504. For example, the appointment associated with the initial reservation 504 may be removed from the calendar.

Figure 6:
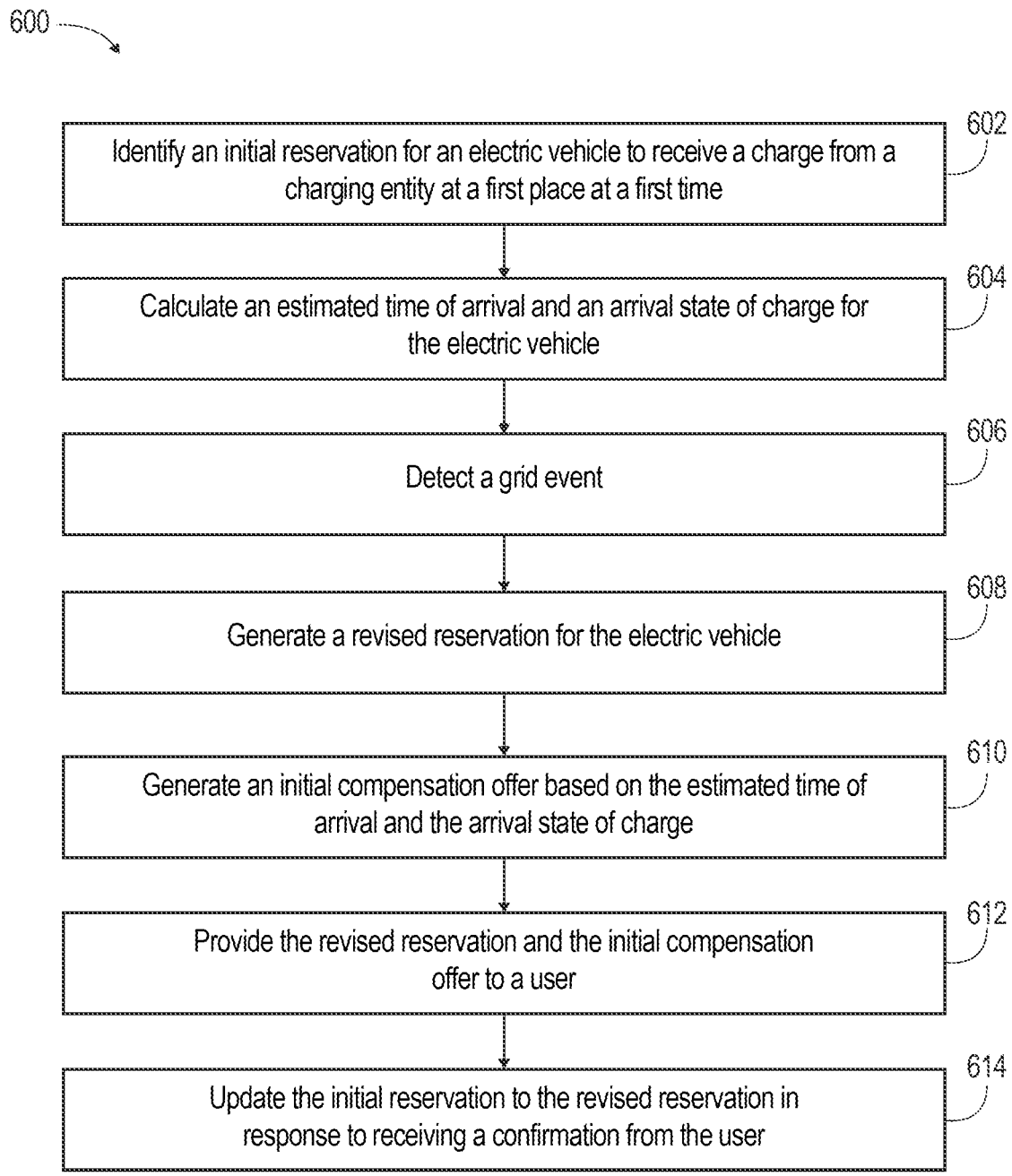
FIG. 6 is a process flow diagram of a method for dynamic charger reservations according to an exemplary embodiment.

FIG. 6 is a process flow diagram of a method 600 for dynamic charger reservations according to an exemplary embodiment of the present disclosure. FIG. 6 will be described with reference to the components of FIGS. 1-5, through it is to be appreciated that the method 600 of FIG. 6 may be used with additional and/or alternative system components.

At block 602, the method 600 includes the reservation module 402 identifying an initial reservation 504 for the EV 102 to receive a charge from a charging entity 120 at a first place at a first time. As discussed above, the reservation module may receive a request from the user 122 for an initial reservation 504. In another embodiment, the reservation module 402 may provide the user 122 a reservation interface, for example, via the display 218 and/or the portable device 222. The initial reservation 504 is associated with a first cost for the charging entity 120. The reservation interface may receive reservation information from the user 122 that the reservation module 402 uses to generate the initial reservation 504.

At block 604, the method 600 includes the estimation module 404 calculating an estimated time of arrival for the EV 102 to arrive at the first place at the first time and an arrival SOC of a battery 106 of the EV 102. The estimation module 404 may calculate the estimated time of arrival and/or the arrival SOC at the reservation time. Alternatively, the estimation module 404 may iteratively calculate the estimated time of arrival and/or the arrival SOC in the time between the reservation time and the first time. Because the calculations may be performed iteratively, the arrival SOC may be based on the estimated time of arrival and a current SOC of the battery 106 of the 102.

At block 606, the method 600 includes detecting a grid event that changes the first cost for the charging entity 120. For example, the grid event module 406 may receive a notification that the electrical grid will experience a grid event at a predetermined time. In some embodiments, the grid event module 406 may determine that the predetermined time falls within the first time of the initial reservation 504.

At block 608, the method 600 includes the reservation module 402 generating a revised reservation for the EV 102. For example, in response to determining that the predetermined time of the grid event falls within the first time of the initial reservation 504, the reservation module may generate a revised reservation at a second time, having duration that does not overlap the predetermined time of the grid event. Because the second time of the revised reservation ensures that the EV 102 will not be charged during the grid event, stress and/or demand on the electrical grid may be reduced. Therefore, the cost to the charging entity may be lower for the revised reservation when compared to the initial reservation 504.

At block 610, the method 600 includes generating an initial compensation offer based on the estimated time of arrival and the arrival SOC. The initial compensation offer may be a reduced rate for the user to charge the EV 102. Additionally or alternatively, the initial compensation offer may include other benefits such as coupons, discounts, access to amenities, and other valuables.

At block 612, the method 600 includes providing the revised reservation and the initial compensation offer to a user. Providing the revised reservation and the initial compensation offer may include presenting the charging station map user interface 500 the revised reservation indicating the compensation offer.

In one embodiment the reservation module 402 may present the charging station map interface through the display 218 of the EV 102 and/or through the display of the portable device 222. The charging station map interface may be presented as a map that may pin point one or more charging stations 112 that may be determined to be within the predetermined distance of the EV 102, as determined by the estimation module 404. Additionally, the charging station map user interface 500 may include confirmation inputs, such as the first confirmation input 508 and the second confirmation input 512.

At block 614, the method 600 includes the update module 410 updating the initial reservation to the revised reservation in response to receiving a confirmation from the user. For example, in response to the user 122 selecting a confirmation input, such as the first confirmation input 508 or the second confirmation input 512, the update module 410 may modify the initial reservation 504 of the user 122 to reflect the revised reservation. Thus, by virtue of the systems and methods described herein, the charger reservations are dynamic in that that initial reservation 504 can be altered to become, for example, the first revised reservation 506 or the second revised reservation 510.

Figure 7:
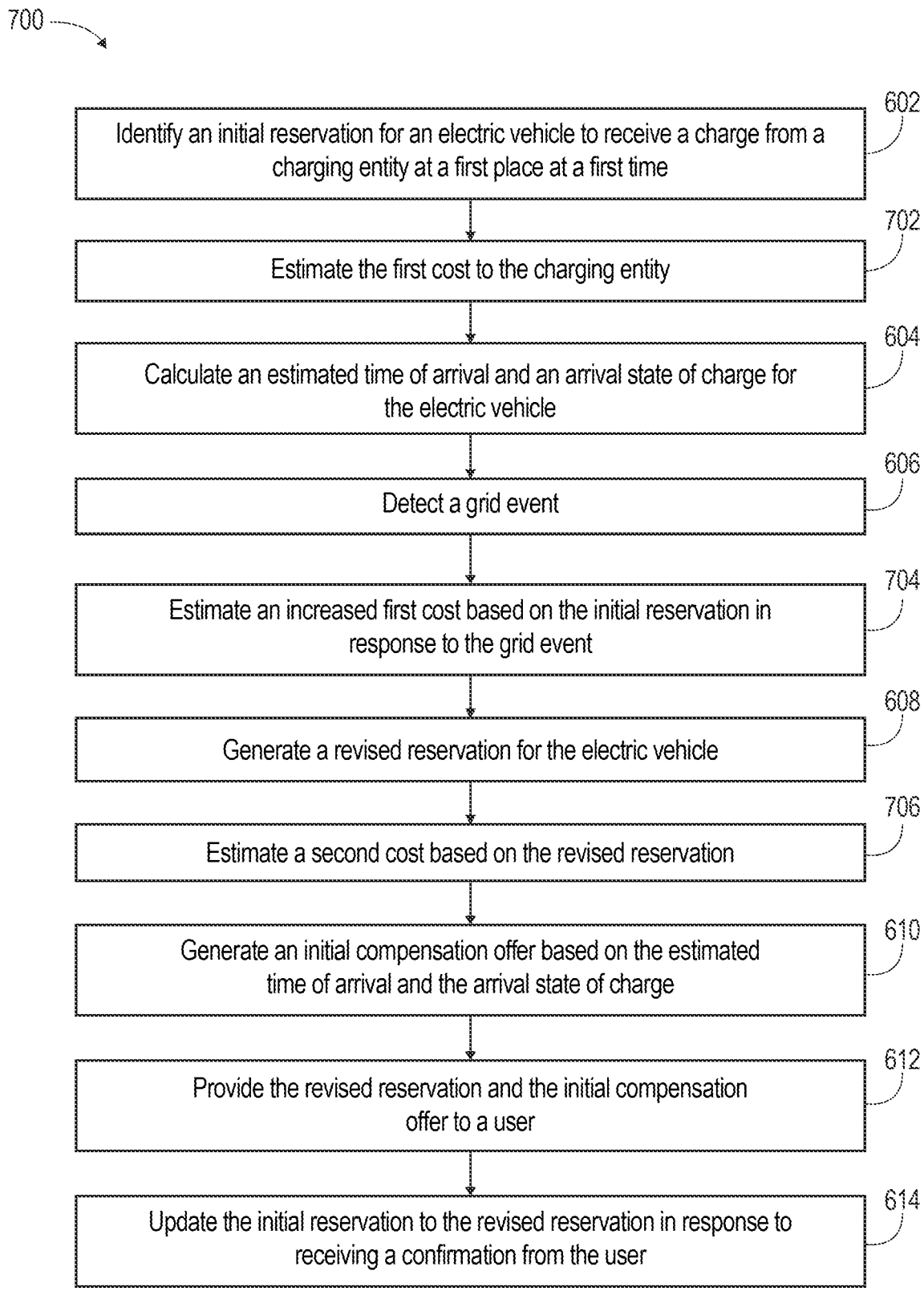
FIG. 7 is a process flow diagram of a method for dynamic charger reservations including estimating cost to the charging entity according to an exemplary embodiment.

FIG. 7 is a process flow diagram of a method 700 for dynamic charger reservations including estimating costs to the charging entity 120 according to an exemplary embodiment of the present disclosure. FIG. 7 will be described with reference to the components of FIGS. 1-6, through it is to be appreciated that the method 700 of FIG. 7 may be used with additional and/or alternative system components. The method 700 includes similar blocks as the method 600 of FIG. 6 that operate in a similar manner as discussed above.

At block 602, the method 700 includes identifying an initial reservation 504 for the EV 102 to receive a charge from a charging entity 120 at a first place at a first time. At block 702, the method 700 includes estimating the first cost that the charging entity 120 will incur to provide the charge to the EV 102 from electrical infrastructure at the first time and the first place.

At block 604, the method 700 includes calculating an estimated time of arrival for the EV 102 to arrive at the first place at the first time and an arrival SOC of a battery 106 of the EV 102 at a reservation time. The arrival SOC is based on the estimated time of arrival and a current SOC of the battery 106 of the 102.

At block 606, the method 700 includes detecting a grid event that changes the first cost for the charging entity 120. At block 704, the method 700 includes estimating a grid event cost that the charging entity 120 will incur to provide the charge to the EV 102 from electrical infrastructure in response to detecting the grid event. The grid event may cause the first cost to increase to the grid event cost for the charging entity 120.

At block 608, the method 700 includes generating a revised reservation for the EV 102. The revised reservation includes a second time or a second place for charging the EV 102. At block 706, the method 700 includes estimating the second cost that the charging entity will incur to provide the charge to the electric vehicle from electrical infrastructure in response to detecting the grid event. The second cost is based on the second time or the second place. The second cost may be lower than the first cost and/or the grid event cost.

At block 610, the method 700 includes generating an initial compensation offer based on the estimated time of arrival and the arrival SOC. At block 612, the method 700 includes providing the revised reservation and the initial compensation offer to a user. Providing the revised reservation and the initial compensation offer may include presenting the charging station map user interface 500 the revised reservation indicating the compensation offer. At block 614, the method 700 includes updating the initial reservation to the revised reservation in response to receiving a confirmation from the user. For example, in response to the user 122 selecting a confirmation input, the initial reservation of the user may be modified by the update module 410 to reflect the revised reservation.

Figure 8:
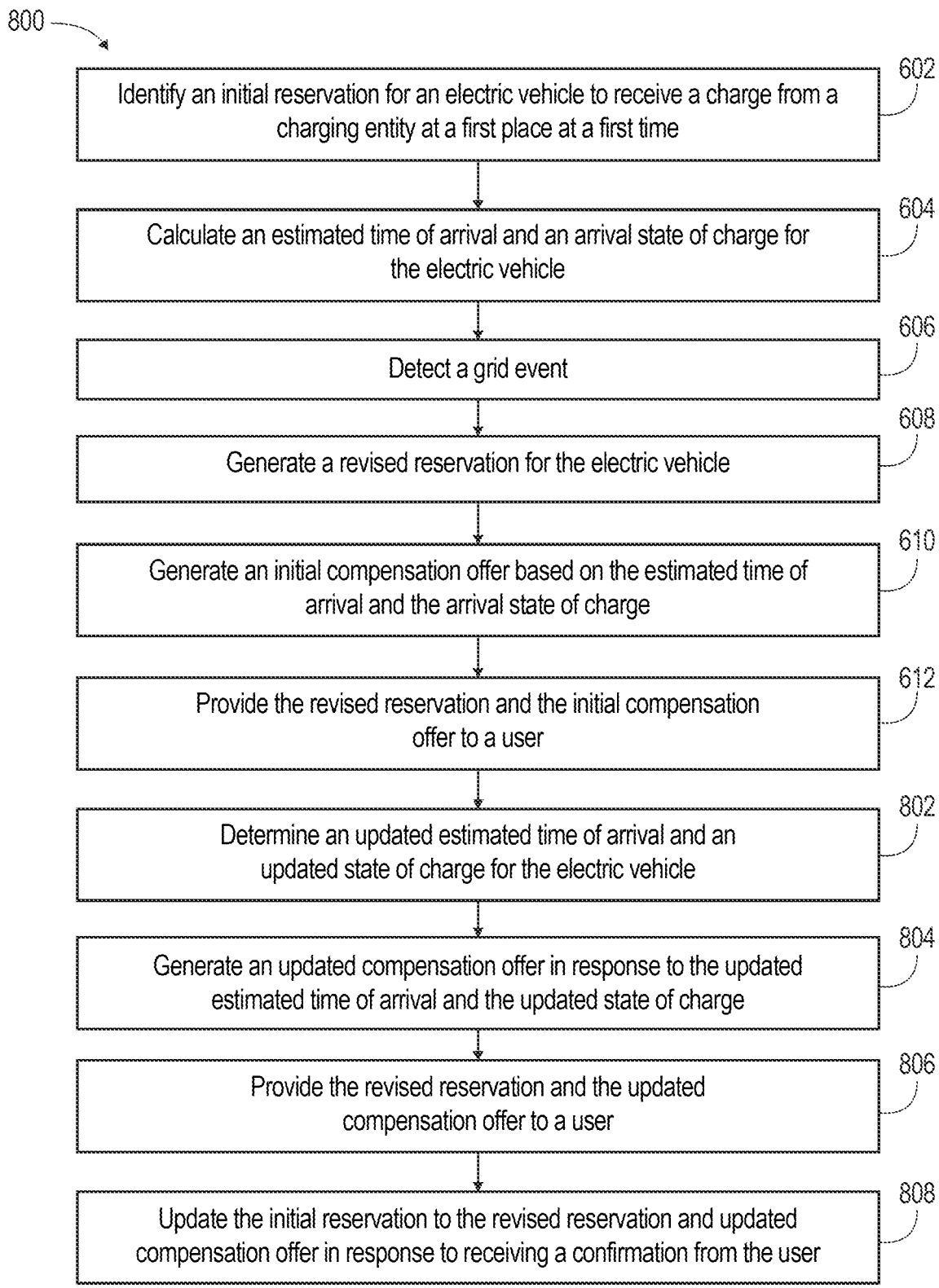
FIG. 8 is a process flow diagram of a method for dynamic charger reservations including iteratively generating compensation offers according to an exemplary embodiment.

FIG. 8 is a process flow diagram of a method 800 for dynamic charger reservations including updating the compensation offer to the user 122 according to an exemplary embodiment of the present disclosure. FIG. 8 will be described with reference to the components of FIGS. 1-6, through it is to be appreciated that the method 800 of FIG. 8 may be used with additional and/or alternative system components. The method 800 includes similar blocks as the method 600 of FIG. 6 that operate in a similar manner as discussed above.

At block 602, the method 800 includes identifying an initial reservation 504 for the EV 102 to receive a charge from a charging entity 120 at a first place at a first time. The initial reservation 504 is associated with a first cost for the charging entity 120.

At block 604, the method 800 includes calculating an estimated time of arrival for the EV 102 to arrive at the first place at the first time and an arrival SOC of a battery 106 of the EV 102 at a reservation time. The arrival SOC is based on the estimated time of arrival and a current SOC of the battery 106 of the 102.

At block 606, the method 800 includes detecting a grid event that changes the first cost for the charging entity 120.

At block 608, the method 800 includes generating a revised reservation for the EV 102. The revised reservation is associated with a second cost for the charging entity 120 that is less than the first cost.

At block 610, the method 800 includes generating an initial compensation offer based on the estimated time of arrival and the arrival SOC.

At block 612, the method 800 includes providing the revised reservation and the initial compensation offer to a user 122. Providing the revised reservation and the initial compensation offer may include presenting the charging station map user interface 500 the revised reservation indicating the compensation offer. In another embodiment, the revised reservation and the initial compensation offer to a user 122 via messaging on the portable device 222. For example, a short message service provided by the portable device 222.

At block 802, the method 800 includes determining an updated estimated time of arrival and an updated arrival SOC of a battery 106 of the EV 102 at a current time after the reservation time. As described above, the updated estimated time of arrival may be based on the current geo-location of the EV 102. For example, the estimation module 404 may request a current geo-location from the GPS 210 of the vehicle computing device 202. Alternatively, the estimation module 404 may request current geo-location from the user 122 via the portable device 222.

At block 804, the method 800 includes the compensation module 408 generating an updated compensation offer in response to the updated estimated time of arrival satisfying a threshold time interval. For example, suppose that the threshold time interval is three hours. If the user 122 has not accepted the revised reservation and initial compensation within three hours of the updated estimated time of arrival, the compensation module 408 may generate an updated compensation offer. In another embodiment, the updated estimated time of arrival may correspond to the first time of the initial reservation. Accordingly, if the user 122 has not accepted the revised reservation and initial compensation within three hours of the first time of the initial reservation 504, the compensation module 408 may generate the updated compensation offer.

In this manner, the threshold time interval may be less than a reservation interval measured between the reservation time and the first time. The updated compensation offer increases compensation to the user as compared to the initial compensation offer. For example, suppose the initial compensation offer includes an incentive price scheme that charges less per kWh than the standard price scheme. The updated compensation offer may replace the initial compensation offer. For example, the updated compensation offer may include greater discounts than those of the incentive price scheme associated with the initial compensation offer.

The updated compensation offer may additionally or alternatively include additional benefits for the user 122. The updated compensation offer may additionally offer the user free movie tickets. For example, the movie tickets may be redeemable at a nearby movie theater during a second time associated with the revised reservation. Accordingly, the updated compensation offer may provide the user 122 with entertainment during the proposed charging time associated with the revised reservation. As another example, the updated compensation offer may include free Wi-Fi at the second place and/or at the second time.

At block 806, the method 800 includes providing the revised reservation and the updated compensation offer to the user 122. The update module 410 may provide the revised reservation and the updated compensation offer to the user 122 in a similar manner as the update module 410 provides the revised reservation and the initial compensation offer to a user 122. For example, the revised reservation and the updated compensation offer may be provided to the user 122 via the charging station map user interface 500.

At block 808, the method 800 includes updating the initial reservation to the revised reservation with the updated compensation offer in response to receiving a confirmation from the user 122. For example, in response to the user 122 selecting a confirmation input, the initial reservation of the user may be modified by the update module 410 to reflect the revised reservation, for example, via a calendar of the user 122.

Therefore, the systems and methods described herein, facilitate the charging entity 120 to determine cost savings associated with modifying reservations for charging the EV 102. Furthermore, to persuade the user 122 to accept a revised reservation a compensation offer may be presented to the user. Accordingly, the reservations are dynamic and can be changed by the charging entity 120 to manage demand on the grid. This can reduce stress on the infrastructure caused by high demand. In another embodiment, the charging entity 120 can better manage the cost of charging the EV 102. Accordingly, the dynamic charger reservations improve the functioning of the electrical grid and infrastructure and improve the business model of the charging entity 120.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein.

A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for dynamic charger reservations, comprising:
communicating with an electric vehicle and a charging entity over a network in real-time;
identifying an initial reservation received from a charging station map user interface of the electric vehicle for the electric vehicle to receive a charge from the charging entity at a first place at a first time, wherein the initial reservation is associated with a first cost for the charging entity;
calculating, by a processor, an estimated time of arrival for the electric vehicle to arrive at the first place at the first time by:
  determining a current geo-location of the electric vehicle via a position determination device of the electric vehicle,
  determining a remaining distance that the electric vehicle will travel based on a current state of charge of the battery of the electric vehicle as communicated in real-time by the electric vehicle and one or more road types that are located within a vicinity of the current geo-location of the electric vehicle, and
  determining an arrival state of charge of a battery of the electric vehicle at the first time, wherein the arrival state of charge is based on the estimated time of arrival and the current state of charge of the battery of the electric vehicle as communicated in real-time by the electric vehicle;
detecting, by the processor, a grid event that changes the first cost for the charging entity to a grid event cost by monitoring and analyzing real-time data from one or more energy providers;
automatically generating, by the processor, a revised reservation for the electric vehicle in response to the detected grid event, wherein the revised reservation is associated with a second cost for the charging entity that is less than at least one of the first cost and the grid event cost and generating the revised reservation includes querying a database of available charging stations and selecting a charging station based on the arrival state of charge, the grid event, and real-time charging station availability data;
generating, by the processor, an initial compensation offer based on the estimated time of arrival and the arrival state of charge, wherein the initial compensation offer is dynamically calculated considering historical user acceptance data;
providing the revised reservation and the initial compensation offer to a user of the electric vehicle via the charging station map user interface, wherein the charging station map user interface is dynamically updated in real-time to display the current geo-location of the electric vehicle and the location of the selected charging station; and
automatically updating, by the processor, the initial reservation to the revised reservation in response to receiving a confirmation from the user via the charging station map user interface.

2. The computer-implemented method of claim 1, further comprising:
estimating the first cost that the charging entity will incur to provide the charge to the electric vehicle from electrical infrastructure at the first time and the first place; and
estimating a grid event cost that the charging entity will incur to provide the charge to the electric vehicle from electrical infrastructure in response to detecting the grid event, wherein the grid event causes the first cost to increase to the grid event cost for the charging entity.

3. The computer-implemented method of claim 1, further comprising:
determining an updated estimated time of arrival and an updated arrival state of charge of a battery of the electric vehicle at a current time after the reservation time; and
generating an updated compensation offer in response to the updated estimated time of arrival satisfying a threshold time interval, wherein the threshold time interval is less than a reservation interval measured between the revised reservation time and the first time.

4. The computer-implemented method of claim 3, wherein the updated compensation offer increases compensation to the user as compared to the initial compensation offer.

5. The computer-implemented method of claim 1, wherein the revised reservation includes a second place or a second time for the electric vehicle to receive the charge.

6. The computer-implemented method of claim 5, further comprising:

estimating the second cost that the charging entity will incur to provide the charge to the electric vehicle from electrical infrastructure in response to detecting the grid event, wherein the second cost is based on the second time or the second place.

7. The computer-implemented method of claim 5, wherein the initial compensation offer is further based on a distance between the first place and the second place or a duration between the first time and the second time.

8. The computer-implemented method of claim 5, wherein the user is associated with a calendar including an appointment for the initial reservation, and wherein updating the initial reservation to the revised reservation includes causing the calendar to alter the appointment with the second place or the second time.

9. The computer-implemented method of claim 1, wherein the revised reservation cancels the initial reservation.

10. A system for dynamic charger reservations, comprising:
an electric vehicle having a charging station map user interface;
a charging entity operably connected for computer communication the electric vehicle;
a charging station computing infrastructure including a memory storing instructions when executed by a processor cause the processor to:
communicate with the electric vehicle and the charging entity over a network in real-time;
identify an initial reservation received from the charging station map user interface for the electric vehicle to receive a charge from the charging entity at a first place at a first time, wherein the charge is associated with a first cost for the charging entity;
calculate an estimated time of arrival for the electric vehicle to arrive at the first place at the first time by:
determining a current geo-location of the electric vehicle via a position determination device of the electric vehicle,
determining a remaining distance that the electric vehicle will travel based on a current state of charge of the battery of the electric vehicle as communicated in real-time by the electric vehicle and one or more road types that are located within a vicinity of the current geo-location of the electric vehicle, and
determining an arrival state of charge of a battery of the electric vehicle at the first time, wherein the arrival state of charge is based on the estimated time of arrival and the current state of charge of the battery of the electric vehicle as communicated in real-time by the electric vehicle;
detect a grid event that changes the first cost for the charging entity to a grid event cost by monitoring and analyzing real-time from one or more energy providers;
automatically generate a revised reservation for the electric vehicle in response to the detected grid event, wherein the revised reservation is associated with a second cost for the charging entity that is less than at least one of the first cost and the grid event cost and generating the revised reservation includes querying a database of available charging stations and selecting a charging station based on the arrival state of charge, the grid event, and real-time charging station availability data;
generate an initial compensation offer based on the estimated time of arrival and the arrival state of charge, wherein the initial compensation offer is dynamically calculated considering historical user acceptance data;
provide the revised reservation and the initial compensation offer to a user of the electric vehicle via the charging station map user interface, wherein the charging station map user interface is dynamically updated in real-time to display the current geo-location of the electric vehicle and the location of the selected charging station; and
automatically update the initial reservation to the revised reservation in response to receiving a confirmation from the user via the charging station map user interface.

11. The system of claim 10, wherein the memory storing instructions when executed by the processor further causes the processor to:
estimate the first cost that the charging entity will incur to provide the charge to the electric vehicle from electrical infrastructure; and
estimate a grid event cost that the charging entity will incur to provide the charge to the electric vehicle from electrical infrastructure in response to detecting the grid event, wherein the grid event causes the first cost to increase to the grid event cost for the charging entity.

12. The system of claim 10, wherein the memory storing instructions when executed by the processor further causes the processor to:
determine an updated estimated time of arrival and an updated arrival state of charge of a battery of the electric vehicle at a current time after the reservation time; and
generate an updated compensation offer in response to the updated estimated time of arrival satisfying a threshold time interval, wherein the threshold time interval is less than a reservation interval measured between the revised reservation time and the first time.

13. The system of claim 10, wherein the revised reservation includes a second place or a second time for the electric vehicle to receive the charge.

14. The system of claim 13, wherein the memory storing instructions when executed by the processor further causes the processor to:
estimate the second cost that the charging entity will incur to provide the charge to the electric vehicle from electrical infrastructure in response to detecting the grid event, wherein the second cost is based on the second time or the second place.

15. A non-transitory computer readable storage medium storing instructions that when executed by a computer, which includes a processor perform a method, the method comprising:
communicating with an electric vehicle and a charging entity over a network in real-time;
identifying an initial reservation received from a charging station map user interface of the electric vehicle for the electric vehicle to receive a charge from the charging entity at a first place at a first time, wherein the initial reservation is associated with a first cost for the charging entity;
calculating an estimated time of arrival for the electric vehicle to arrive at the first place at the first time by:
determining a current geo-location of the electric vehicle via a position determination device of the electric vehicle,
determining a remaining distance that the electric vehicle will travel based on a current state of charge of the battery of the electric vehicle as communicated in real-time by the electric vehicle and one or more road types that are located within a vicinity of the current geo-location of the electric vehicle, and determining an arrival state of charge of a battery of the electric vehicle at the first time, wherein the arrival state of charge is based on the estimated time of arrival and the current state of charge of the battery of the electric vehicle as communicated in real-time by the electric vehicle;

detecting a grid event that changes the first cost for the charging entity to a grid event cost by monitoring and analyzing real-time data from one or more energy providers;

automatically generating a revised reservation for the electric vehicle in response to the detected grid event, wherein the revised reservation is associated with a second cost for the charging entity that is less than at least one of the first cost and the grid event cost and generating the revised reservation includes querying a database of available charging stations and selecting a charging station based on the arrival state of charge, the grid event, and real-time charging station availability data;

generating an initial compensation offer based on the estimated time of arrival and the arrival state of charge, wherein the initial compensation offer is dynamically calculated considering historical user acceptance data;

providing the revised reservation and the initial compensation offer to a user of the electric vehicle via the charging station map user interface, wherein the charging station map user interface is dynamically updated in real-time to display the current geo-location of the electric vehicle and the location of the selected charging station; and automatically updating the initial reservation to the revised reservation in response to receiving a confirmation from the user via the charging station map user interface.

16. The non-transitory computer readable storage medium of claim 15, further comprising:

estimating the first cost that the charging entity will incur to provide the charge to the electric vehicle from electrical infrastructure at the first time and the first place; and estimating an grid event cost that the charging entity will incur to provide the charge to the electric vehicle from electrical infrastructure in response to detecting the grid event, wherein the grid event causes the first cost to increase to the grid event cost for the charging entity.

17. The non-transitory computer readable storage medium of claim 15, further comprising:

determining an updated estimated time of arrival and an updated arrival state of charge of a battery of the electric vehicle at a current time after the reservation time; and generating an updated compensation offer in response to the updated estimated time of arrival satisfying a threshold time interval, wherein the threshold time interval is less than a reservation interval measured between the revised reservation time and the first time.

18. The non-transitory computer readable storage medium of claim 15, wherein the revised reservation includes a second place or a second time for the electric vehicle to receive the charge.

19. The non-transitory computer readable storage medium of claim 18, further comprising:

estimating the second cost that the charging entity will incur to provide the charge to the electric vehicle from electrical infrastructure in response to detecting the grid event, wherein the second cost is based on the second time or the second place.

\* \* \* \* \*